United States Patent [19]

Abdulally

[11] Patent Number: 5,372,791

[45] Date of Patent: * Dec. 13, 1994

[54] FLUIDIZED BED SYSTEM AND A FLUIDIZATION AND COOLING NOZZLE FOR USE THEREIN

[75] Inventor: Igbal F. Abdulally, Randolph, N.J.

[73] Assignee: Foster Wheeler Energy Corporation, Clinton, N.J.

[*] Notice: The portion of the term of this patent subsequent to Apr. 7, 2009 has been disclaimed.

[21] Appl. No.: 870,848

[22] Filed: Apr. 20, 1992

[51] Int. Cl.⁵ .................. B01J 8/18; F27B 15/14; F26B 17/00; B29C 45/20
[52] U.S. Cl. .................. 422/139; 422/146; 34/585; 34/577; 239/86
[58] Field of Search ............ 422/139, 146; 34/57 A, 34/57 B, 57 R, 10; 432/15, 58; 239/86, 132, 132.1, 132.5; 261/94, 668, 116

[56] References Cited

U.S. PATENT DOCUMENTS

| | | | |
|---|---|---|---|
| 3,553,847 | 1/1971 | Kramer et al. | 34/57 A |
| 3,556,734 | 1/1971 | Peterson | 261/98 |
| 3,761,065 | 9/1973 | Rich et al. | 261/116 |
| 3,767,177 | 10/1973 | Engalitcheff, Jr. et al. | 261/116 |
| 4,021,193 | 5/1977 | Waters | 432/58 |
| 4,152,843 | 5/1979 | Kemmetmueller | 34/57 A |
| 4,165,040 | 8/1979 | Beacham et al. | 432/15 |
| 4,421,725 | 12/1983 | Dezael et al. | 261/116 |
| 4,460,330 | 7/1984 | Asai et al. | 431/170 |
| 4,660,768 | 4/1987 | Bunthoff et al. | 34/57 B |
| 4,829,912 | 5/1989 | Alliston et al. | 110/345 |
| 5,101,576 | 4/1992 | Abdulally | 34/57 R |

Primary Examiner—Robert J. Warden
Assistant Examiner—Christopher Y. Kim
Attorney, Agent, or Firm—Marvin A. Naigur

[57] ABSTRACT

A fluidized bed system in which a plate is disposed in an enclosure and is adapted to support particulate material. A nozzle is supported by the plate for receiving air and water and directing the air and water and into the particulate material to fluidize and cool same.

3 Claims, 2 Drawing Sheets

FLUIDIZED BED SYSTEM AND A FLUIDIZATION AND COOLING NOZZLE FOR USE THEREIN

BACKGROUND OF THE INVENTION

This invention relates to a fluidized bed system and a nozzle for use therein and, more particularly, to such a system having a bed of particulate material in an enclosed space which is fluidized and cooled by the introduction of air and water into the bed through a plurality of nozzles.

Fluidized bed reactors, such as gasifiers, steam generators, combustors, and the like, are well known. In these arrangements, pressurized air or other fluidizing media is passed, via a plurality of nozzles, through a bed of particulate material, including a fossil fuel such as coal and an adsorbent for the sulfur generated as a result of combustion of the coal, to fluidize the bed and to promote the combustion of the fuel at a relatively low temperature. The entrained particulate solids are usually separated externally of the bed and recycled back into the bed. The heat produced by the fluidized bed is utilized in various applications such as the generation of steam, which results in an attractive combination of high heat release, high sulfur adsorption, low nitrogen oxides emissions and fuel flexibility.

However, fluidized bed reactors require careful control of several parameters, including particle size distribution to avoid increasing the volume of the relatively fine particles in the reactor to unacceptably high levels. Also, bed temperature must be controlled in order to prevent undesirable temperature excursions and agglomeration of the bed material.

Particle size distribution is often controlled by removing the relative fine particles from the reactor, stripping them with a stream of air in a secondary fluidized bed and recirculating them back to the reactor. An example of this technique is disclosed in U.S. Pat. No. 4,829,912, assigned to the assignee of the present invention. These secondary fluidized beds can also perform a cooling function and are often termed "stripper/coolers". A stripper/cooler located adjacent the furnace section of the reactor can accomplish both the recirculation of the finer portions of the removed, particulate material and the removal of heat from the removed but non-recirculated, particulate material. In these types of arrangements, the stripper/cooler receives the particulate material from the furnace section through a drain pipe and air is blown through a first section of the stripper/cooler to strip, or entrain, some of the finer portions of the particulate material which are returned to the furnace section. The remaining particulate material in the stripper/cooler is then usually passed to a cooler section where heat is removed from the particulate material by passing water/steam in a heat exchange relation to the particulate material or by blowing air through it before it is discharged from the system. When air is used to remove the heat from the non-recirculated particulate material, this air is often returned to the furnace section as preheated combustion supporting air.

However, in some situations, such as when fuels that generate an excessive amount of relatively fine ash are used, or when a relatively large amount of relatively fine adsorbent has to be used with fuels having a relatively high sulfur content, the relatively fine particle material stripped in the stripper/cooler and returned to the furnace section increases the volume of the fines in the furnace section, or the upper furnace loading, to unacceptably high levels. Excessive upper furnace loading requires larger and more expensive stripper/coolers and separators and/or requires that the furnace be operated at a low stoichiometric condition, which is inefficient.

This upper furnace loading is made worse when the method used to cool the particulate material in the cooler section of the stripper/cooler is by blowing air through the material. To achieve a high cooling rate, the air velocity and flow rate through the cooler section must be relatively high. A high air velocity and flow rate, however, entrains greater amounts of particulate material resulting in an even greater volume of fines returned to the furnace section when this air is used as combustion supporting air, thereby further increasing the upper furnace loading. To complicate the matter even further, a high air velocity in the cooler section is also necessary to prevent agglomeration of the particulate material in the stripper/cooler caused by relatively high temperatures in the stripper/cooler due to the combustion of unburned carbon. Making the stripper/cooler larger in area to alleviate this concern does not help since unacceptably high amount of combustion air is used in the stripper/cooler, thereby leaving less than adequate air for proper process control requirements.

Thus a significant need arises for improved temperature control of a fluidized bed reactor and stripper/cooler.

SUMMARY OF THE INVENTION

It is therefore an object of the present invention to provide a fluidized bed system in which the bed material is directly cooled by a cooling fluid.

It is a further object of the present invention to provide a system of the above type in which a plurality of atomizing nozzles are provided for distributing atomized cooling fluid to the bed material.

It is a further object of the present invention to provide a system of the above type in which temperature excursions are reduced.

It is a further object of the present invention to provide a system of the above type which enjoys an increased capacity.

It is a further object of the present invention to provide a fluidized bed system of the above type which prevents the formation of agglomerates.

It is a further object of the present invention to provide an atomizing nozzle for fluidizing and cooling the bed material in a fluidized bed system.

It is therefore an object of the present invention to provide a atomizing nozzle of the above type which introduces atomized cooling fluid from a plenum into an enclosure containing a bed of particulate material to both fluidize and cool the particulate material.

Toward the fulfillment of these and other objects, the fluidized bed system of the present invention includes a distributor plate which supports a bed of particulate material to be combusted and cooled. A plurality of nozzles are mounted on the plate and receive air flow from a plenum located below the plate for distributing the air into the bed. A cooling fluid is also introduced into the nozzle which is discharged into the bed with the air to fluidize and cool the material.

DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED EMBODIMENT

Figure 1:
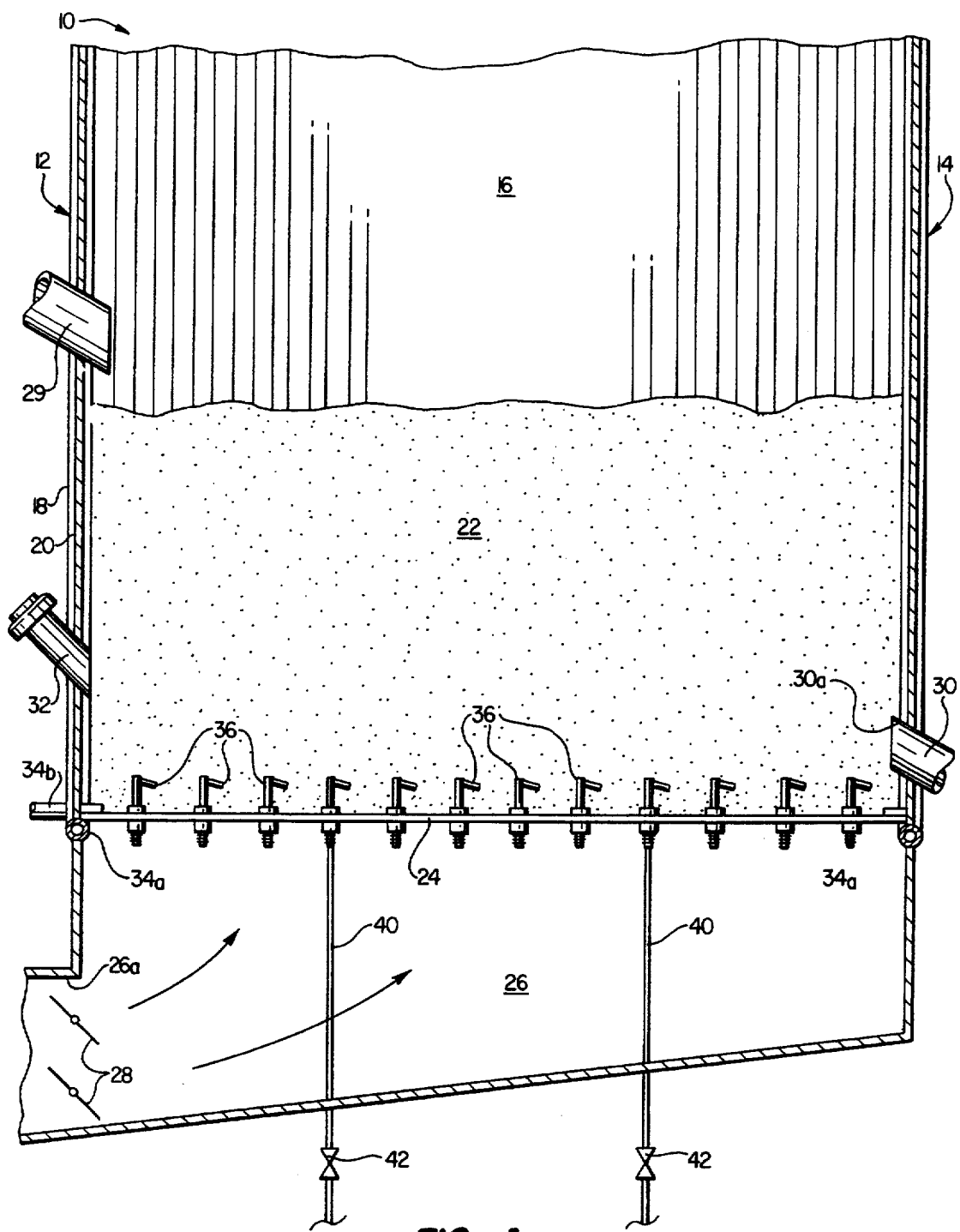
FIG. 1 is a vertical sectional view of a fluidized bed reactor depicting a plurality of nozzles of the present invention.

The fluidized bed reactor of the present invention is shown in FIG. 1 of the drawings and includes an enclosure 10 consisting of a front wall 12, a rear wall 14, and two sidewalls, one of which is shown by the reference numeral 16. Each wall may be formed by a plurality of vertically-extending tubes 18 disposed in a spaced, parallel relationship and connected together by a plurality of elongated fins 20 extending for the entire lengths of the tubes and connected to diametrically opposed surfaces of the tubes in a conventional manner. The upper portion of the enclosure 10 is not shown for the convenience of presentation, it being understood that it consists of a convection section, a roof and an outlet for allowing the combustion gases to discharge, also in a conventional manner.

A bed of particulate material, shown in general by the reference numeral 22, is disposed within the enclosure 10 and rests on a perforated plate or grid 24 extending horizontally in the lower portion of the enclosure. The bed 22 can consist of a mixture of discrete particles of fuel material such as bituminous coal, and an adsorbent, such as limestone, for absorbing the sulfur released by the combustion of the fuel material.

An air plenum 26 is provided immediately below the plate 24 and an inlet duct 26a is provided through the plenum for distributing pressurized gas, such as air, from an external source (not shown) to the plenum under the control of a set of dampers 28.

An overbed feeder 29 extends through the front wall 12, receives particulate coal from inlet ducts or the like (not shown), and is adapted to feed the coal particles onto the upper surface of the bed 22. The feeder 29 can operate by gravity discharge or can be in the form of a spreader-type feeder or any other similar device. It is understood that a feeder can also be provided for discharging the adsorbent onto the bed 22, and would be constructed and arranged in a manner similar to the feeder 29.

A drain pipe 30 extends through the rear wall 14 and has an inlet end portion 30a that registers with the interior of the enclosure 10 in communication with the lower portion of the bed 22. The pipe 30 is thus adapted to receive the spent bed material and functions to discharge the material from the enclosure 10 to a fluidized bed stripper/cooler, a screw cooler, a conveyor belt, or the like (not shown). This discharge can be by gravity or can be air assisted.

A bed light-off burner 32 is provided for initially lighting off the bed during startup in a conventional manner, it being understood that an additional burner (not shown) can be placed in the duct 26a for this purpose.

A pair of horizontal headers 34a are connected in fluid communication with the tubes 18 forming the front wall 12 and the rear wall 14, respectively, and another horizontal header 34b is connected in fluid communication with the tubes 18 forming the sidewall 16. It is understood that similar headers are provided in communication with both ends of the other sidewall and the upper ends of the walls 12 and 14. As a result, a fluid to be heated can be sequentially or simultaneously passed through the walls 12, 14 and 16 to pick up the heat from the fluidized bed in a conventional manner.

A plurality of nozzles, each referred to in general by the reference numeral 36, extend through openings formed in, and are supported by, the plate 24. Thus, the air from the plenum 26 enters the lower end of each nozzle 36, passes upwardly through the length of the nozzle and discharges from a horizontal discharge portion thereof into the bed 22. A portion of the nozzles 36 are provided with a fluid line, or pipe which is shown by the reference number 40 in connection with two of the nozzles 36. Each pipe 40 extends from below the enclosure 10, through the plenum 26 and into and through its corresponding nozzle 36 for discharging fluid into the nozzle as will be described. A valve 42 is connected in each pipe 40 for controlling the flow of the fluid to its respective nozzle 36.

Figure 2:
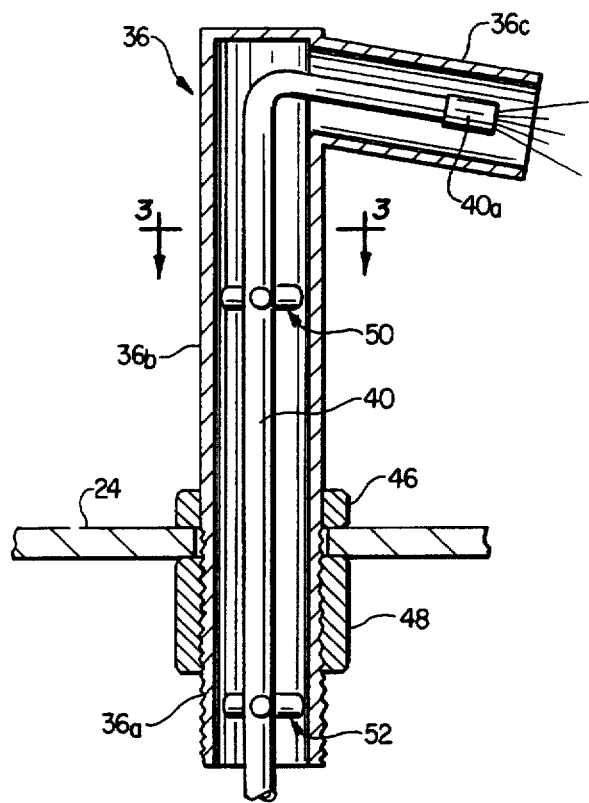
FIG. 2 is an enlarged, vertical sectional view of a nozzle of FIG. 1, with the bed material omitted in the interest of clarity.
Figure 3:
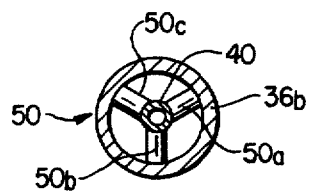
FIG. 3 is a cross-sectional view taken along the lines 3—3 of FIG. 2.

The details of a nozzle 36 are shown in FIGS. 2 and 3. Each nozzle 36 extends through a corresponding opening in the plate 24 and is formed by an externally threaded lower vertical portion 36a projecting below the plate 24 for receiving air from the plenum 26, an upper vertical portion 36b extending above the plate and into the fluidized bed 22 (FIG. 1) and a discharge portion 36c registering with an opening formed through the upper end portion of the upper nozzle portion 36b. The discharge portion 36c extends downwardly at a slight angle to the horizontal and has an open distal end. Thus, air travels upwardly through the nozzle portions 36a and 36b before entering the discharge portion 36c and discharging through its open end into the fluidized bed 22 (FIG. 1).

An upper ring member 46 is secured to the upper nozzle portion 36b and rests against the upper surface of the plate 24 to locate the nozzle 36 in the position shown. An internally threaded nut, or sleeve 48 extends just below the plate 24 and in threaded engagement with the threaded lower nozzle portion 36a. After the nozzle 36 is inserted through the opening in the plate 24, the sleeve 48 can be advanced upwardly on the externally threaded lower nozzle portion 36a until it engages the lower surface of the plate 24 to secure the nozzle 36 in the position shown. The nozzle 36 can also be welded to the plate, as needed.

With respect to the nozzles 36 that receive a pipe 40, the pipe extends vertically for the full length of the nozzle portions 36a and 36b, bends at the junction of the nozzle portions 36b and 38c and extends horizontally for substantially the entire length of the nozzle portion 36c. A discharge head 40a is provided on the end of the pipe 40 and is disposed just inside the discharge end of the nozzle portion 36c. The discharge head 40a receives cooling fluid, such as water, from the pipe 40 and discharges it in one or more relative fine streams in a conventional manner, as will be described.

The diameter of the pipe 40 is less than that of the inner diameter of the nozzle 36 and is supported in a coaxial relationship with the nozzle by a two axially spaced strut assemblies 50 and 52. As shown in FIG. 3 the strut assembly 50 consists of three radially extending strut members 50a, 50b and 50c which extend between the outer surface of the pipe 40 and the inner wall of the nozzle 36 and are connected thereto in any conventional manner. The strut assembly 52 is identical to the strut assembly 50 and therefore is not shown in detail.

In operation, and assuming the fluidized bed has been fired and is fully operational, pressurized gas, such as air, passes through the duct 26a, the open dampers 28 and the plenum 26 before passing upwardly through the lower portion 36a of each nozzle 36. In the case of nozzles 36 not provided with a pipe 40, the air passes through the nozzle portions 36b and 36c before discharging from the end of the portions 36c in flow streams extending slightly downwardly towards the plate 24 (FIG. 1) to fluidize and cool the material in the bed 22. When a pipe 40 is disposed in a nozzle 36, the air from the plenum 26 passes upwardly through the annular space between the pipe 40 and the internal wall of the lower nozzle portion 36a, continues upwardly through the upper nozzle portion 36b and then passes into the discharge nozzle portion 36c. Cooling fluid, such as water is introduced into each pipe 40 associated with a nozzle 36 and, under control of the valve 42, flows into and through the pipe before discharging outwardly from the head 40a. The discharging air in the nozzle portion 36c surrounds the discharging fluid and thus atomizes, or mechanically subdivides, the fluid into a plurality of relatively fine droplets in a conventional manner. The resulting mixture discharges from the end of the nozzle portion 36c and passes into the bed 22 in a flow stream extending slightly downwardly and towards the plate 24 (FIG. 1). The fluid provides enhanced cooling of the relatively hot particulate material in the bed 22 and the air passes through the bed to fluidize same, and then through the enclosure 10 in a generally upwardly direction by natural convection. Thus, that portion of the particulate material in the bed 22 extending immediately above the nozzle portion 36c is cooled and fluidized and the portion extending between the latter portion and the upper surface of the plate 24 remains dormant, or stagnant.

As shown in FIG. 1, the nozzles 36 are oriented so that their horizontal discharge portions 36c are directed towards the rear wall 14. Although not clear from the drawing, it is understood that the discharge portions 36c can also be directed towards the drain pipe 34. As a result of this orientation, a momentum is imparted to the bed material which induces a circulation of the material to insure superior distribution, cooling, mixing and draining of the particulate material.

Fluid, such as water, to be heated is passed into the headers 34a and 34b where it passes simultaneously, or in sequence, through the tubes 18 forming the walls 12, 14 and 16 to add heat from the fluidized bed to the fluid before it is passed to external apparatus for further processing.

As a result of the foregoing, the discharge of air and fluid into the particulate material in the bed 22 in the foregoing manner provides fluidization and enhanced cooling. Also the fluidization and cooling can be precisely controlled by controlling the amount and velocity of the fluidizing air discharged by the nozzles 36, the number of nozzles 36 provided with the pipes 40, and the amount of cooling fluid discharged by the nozzles 36 as controlled by the valves 42. Thus temperature excursions in the enclosure 10 are reduced and the formation of agglomerates is prevented.

Figure 4:
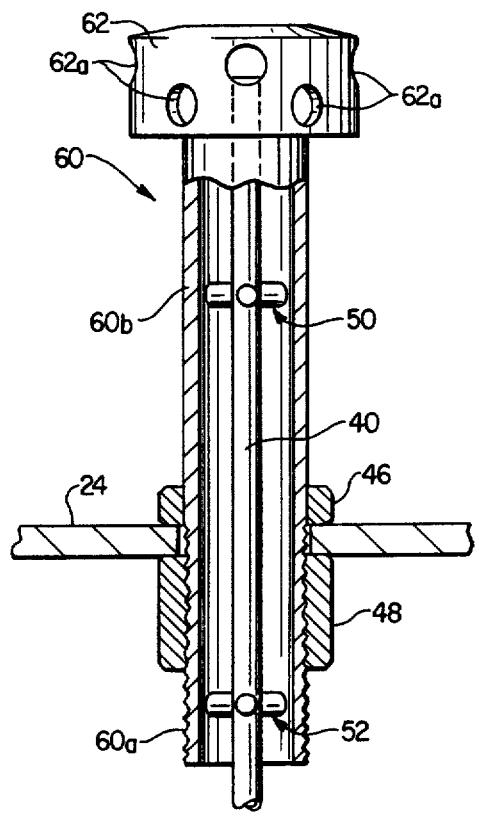
FIG. 4 is a view similar to FIG. 2 but depicting an alternate embodiment of the nozzle of FIG. 2.

The embodiment of FIG. 4 is similar to that of FIGS. 2 and 3 and includes several components of the latter embodiment which are given the same reference numerals. According to the embodiment of FIG. 4, a nozzle 60 is provided which is adapted to be installed in the reactor enclosure 10 in the same manner as the nozzles 36. To this end, each nozzle 60 has a lower vertical portion 60a and an upper vertical portion 60b which are identical to the nozzle portions 36a and 36b respectively of the embodiment of FIGS. 2 and 3 and are mounted to the plate 24 in the same manner using the same components as the latter embodiment. A discharge head 62 is connected to the upper end of the vertical portion 60b in any known manner and is in the form of a hollow circular head (shown in elevation) extending from the discharge portion 60b and having two rows of radially-extending discharge openings 62a formed around its outer periphery, with each row formed by a plurality of circumferentially spaced openings.

The nozzle 60 receives a pipe 40 for supplying cooling fluid to the nozzle in the manner discussed above. The pipe 40 terminates at a point on the axis of the discharge head 62 at a level approximately midway between the upper and lower surfaces of the head and has an open upper end for discharging the fluid.

In operation of the nozzle 60, air supplied to the plenum 26 (FIG. 1) passes upwardly through the nozzle 60 and discharges from the head 62 into the bed 22 in a plurality of angularly-spaced, radially extending flow streams. Water is introduced into the pipe 40, discharges into the center of the head 62 and is atomized by the air before discharging with the air in the manner discussed above. Thus according to the embodiment of FIG. 4, the air and water discharge into the bed 22 (FIG. 1) in a uniform, symmetrical flow pattern to fluidize the bed and provide enhanced cooling. As in the previous embodiment, a pipe 40 can be provided in all, or a portion of the nozzles 60 to provide the enhanced cooling, as needed.

Figure 5:
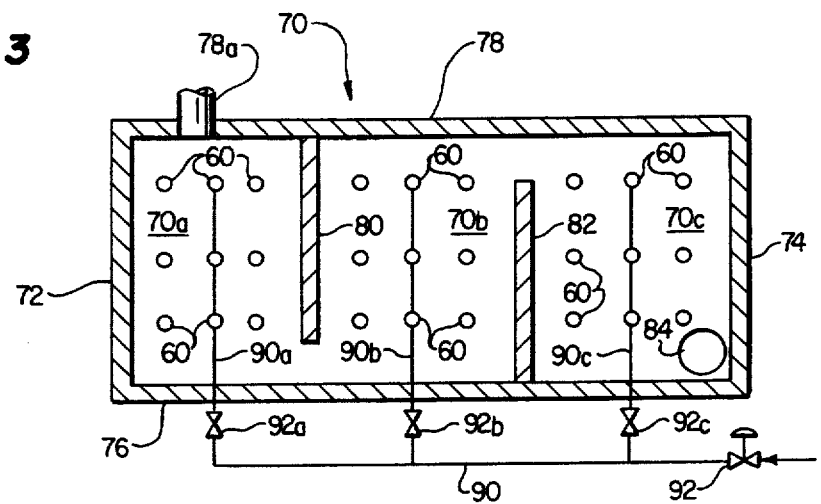
FIG. 5 is a plan view of a fluidized bed stripper/cooler utilizing the nozzles of the present invention.

The nozzles 36 and 60 of the present invention can also be utilized in a secondary fluidized bed, such as a fluidized bed stripper/cooler shown in general in plan view in FIG. 5. The stripper/cooler is formed by a rectangular enclosure 70 defined by a front wall 72, a rear wall 74, and two side walls 76 and 78, as well as a floor and a roof (not shown). Typically the stripper/cooler is used with a fluidized bed reactor such as the reactor shown in FIG. 1, in which case the enclosure 70 would receive relatively hot particulate material from the reactor via an appropriate duct, or the like, which is connected to an inlet 78a provided through the wall 78. In the event the associated reactor is used for the purposes of steam generation, the walls 72, 74, 76 and 78 would be formed by a plurality of heat exchange tubes in association with a plurality of headers and flow circuitry as previously described. A vertical partition 80 extends from the side wall 78 and between the roof and the floor of the enclosure 70 with its end spaced from the wall 76. Similarly, a vertical partition 82 extends from the wall 76 and between the roof and the floor of the enclosure 70 with its end spaced from the wall 78. The enclosure 70 is thus divided into three chambers 70a, 70b and 70c, with the chamber 70a registering with the inlet 78a, and a drain 84 provided in the corner of the chamber 70c.

It is understood that a horizontally extending, perforated plate (not shown but identical to the plate 24 in the embodiment of FIG. 1) is disposed in the lower portion of the enclosure 70 and is spaced from the floor of the enclosure to define a plenum for receiving air under the control of dampers which are also disclosed in the latter embodiment. A plurality of nozzles are provided through perforations in the plate and extend upwardly into the particulate material supported thereon and, for the purposes of example, the nozzles 60 of the embodiment of FIG. 4 are shown. The nozzles 60 are secured in the perforations in the plate 24 in the manner described in connection with the embodiment of FIG. 4 and nine of the nozzles are connected to a source of cooling fluid. To this end, a conduit 90 is provided adjacent the enclosure 70 and receives cooling fluid, such as water, from an external source under the control of a valve 92. Conduit 90 branches into three branch conduits 90a, 90b and 90c which extend through the wall 76 into the chambers 70a, 70b and 70c respectively, and below the plate 24, where they are connected to the pipes 40 (FIG. 4) associated with the nine nozzles 60. Valves 92a, 92b and 92c are provided in the branch conduits 90a, 90b and 90c, respectively, to control the flow of the cooling fluid into and through the branch lines, and therefore to the pipes 40 and their associated nozzles 60.

In operation of the stripper/cooler of FIG. 5, particulate material, such as that from the reactor of FIG. 1 is introduced into the chamber 70a via the inlet 78a, is supported on the perforated plate and migrates through the spaces adjacent the ends of the partitions 80 and 82 into the chambers 70b and 70c, respectively. Air is introduced to the plenum below the perforated plate and passes into and through the nozzles 60. Water under the control of the valve 92 is introduced, via the conduit 90 and the branch conduits 90a, 90b and 90c, into those nozzles 60 provided with the pipes 40 which, in the example shown consists of the three of the nozzles 60 in each of the chambers 70a, 70b and 70c. The fluid discharges at the upper portion of the discharge head 62 associated with each nozzle 60 and is therefore atomized by the air passing therethrough as described above. Thus, the atomized water cools the particulate material in each chamber 70a, 70b and 70c while the air serves to fluidize the particulate material and strip the relatively fine portions therefrom which exit through a suitable outlet or the like (not shown) provided in the enclosure 70. The relatively coarse material remaining in the enclosure 70 can discharge from the enclosure via the drain 84 and it, as well as the relatively fine, stripped material can be reutilized as needed. For example, the fine material can be recycled back to the fluidized bed in the reactor of FIG. 1.

The fluidized bed reactor, the stripper/cooler and the nozzles of the present invention thus enjoy several advantages. For example, the bed material in the enclosures 10 and 70 is directly cooled by the air and the atomized water which are evenly distributed throughout the enclosures. Also, the resultant enhanced cooling eliminates temperature excursions and the formation of agglomerates in the reactor and the stripper/cooler. Further the stripper/cooler can enjoy an increased capacity as a result of the foregoing cooling and fluidization. Still further the nozzles provide uniform distribution of the cooling fluid. Also, the air and fluid discharge patterns from the nozzles prevent any backflow of the particulate material.

It is understood that several variations may be made in the foregoing without departing from the scope of the invention. For example, the number and specific locations of the nozzles 36 and 60 and their specific orientation can be varied as long as the above objectives and results are achieved. Also, fluid can be introduced in the foregoing manner to all of the nozzles 36 or only to a selected portion of same, as needed. Further, the fluid does not have to be atomized by the air discharging from the nozzles 36. Also, the nozzles of the present invention can be used in other fluidized bed systems such as J-valves, seal pots, etc. Still further, the water supply pipes could be fabricated in separate parts and connected together in a conventional manner.

Further modifications, changes and substitutions are intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A fluidization nozzle for use in a fluidized bed system having an enclosure for receiving particulate material, a plate disposed in said enclosure and adapted to support said particulate material, and a plenum located below said plate for receiving air; said nozzle comprising a vertical tubular portion supported by said plate for receiving air from said plenum, a tubular discharge portion connected to said vertical tubular portion and extending at a downwardly-directed angle from said vertical tubular portions and means for providing a cooling fluid to one of said tubular portions for mixing with said air, said tubular discharge portion having at least one discharge opening for discharging said fluid and said air in a flow stream extending at said angle and into said particulate material to fluidized same.

2. The nozzle of claim 1 wherein an outlet of said means for providing said cooling fluid is within one of said tubular portion, wherein said air and said fluid mix in said nozzle before discharging therefrom.

3. The nozzle of claim 1 wherein said means for providing cooling fluid comprises a pipe for receiving said cooling fluid and discharging same in the path of said air through said nozzle.

* * * * *

UNITED STATES PATENT AND TRADEMARK OFFICE
CERTIFICATE OF CORRECTION

PATENT NO. : 5,372,791
DATED : December 13, 1994
INVENTOR(S) : Iqbal F. Abdulally It is certified that error appears in the above-indentified patent and that said Letters Patent is hereby corrected as shown below:

On the title page, item [75] Inventor: should read --Iqbal F. Abdulally--.

Signed and Sealed this

Fourteenth Day of March, 1995

Attest:

BRUCE LEHMAN

*Attesting Officer*        *Commissioner of Patents and Trademarks*